(No Model.)
T. J. LOVETT.
TIRE.
No. 588,343. Patented Aug. 17, 1897.
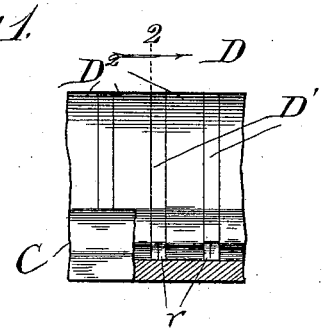
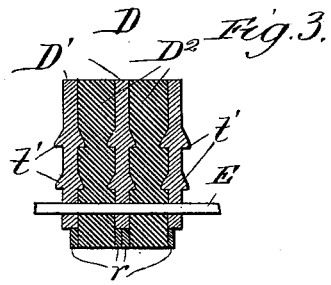
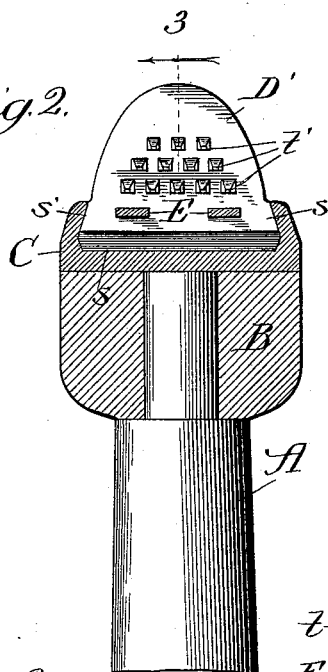
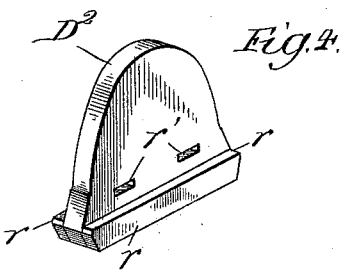
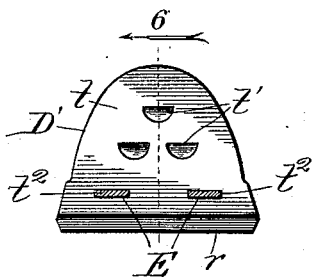
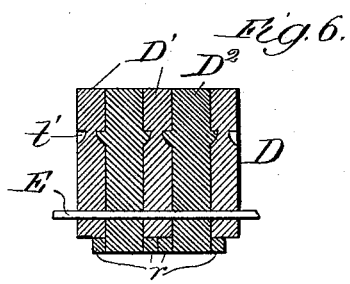
Witnesses:
Inventor:
Thomas J. Lovett.
By Dyrenforth & Dyrenforth,
Att'ys.

UNITED STATES PATENT OFFICE.

THOMAS J. LOVETT, OF CHICAGO, ILLINOIS, ASSIGNOR, BY DIRECT AND MESNE ASSIGNMENTS, TO THE BUDD DOBLE COMBINATION RUBBER TIRE COMPANY, OF NEW YORK.

TIRE.

SPECIFICATION forming part of Letters Patent No. 588,343, dated August 17, 1897.

Application filed March 1, 1897. Serial No. 625,545. (No model.)

*To all whom it may concern:*

Be it known that I, THOMAS J. LOVETT, a citizen of the United States, residing at Chicago, in the county of Cook and State of Illinois, have invented a new and useful Improvement in Tires, of which the following is a specification.

My invention relates to improvements in the construction of the circumferential face portions of wheels where the effect of a peripheral cushion possessing a desired resilience and great durability may be beneficial.

While my improvements may be employed to advantage in the construction of wheels and pulleys for many and various uses, perhaps their more general use will be as tires for vehicle-wheels to take the place more or less generally of the cushion-tires as hitherto constructed.

My object is to provide an improved cushion-tire or circumferential face portion of a wheel which shall be resilient to a marked degree, but so constructed that the soft or cushioning material shall be exposed at its peripheral surface and be protected against undue wear or injury in use by contiguous exposed surfaces of harder or more durable material. I accomplish my object by forming the tire or circumferential face portion, broadly stated, of abutting sections extending crosswise of the circumference, the sections consisting of pieces or segments of cushioning material and pieces or segments of protecting material, the protecting material being itself cushioned in the cushioning material.

In the drawings, which illustrate my improvement in the form of tire for a vehicle-wheel, Figure 1 is a broken segment of a rim and a tire involving my invention; Fig. 2, a broken cross-section taken on line 2 of Fig. 1 and showing the rim on the felly of a wheel; Fig. 3, a broken section taken on line 3 of Fig. 2; Fig. 4, a perspective view of one of the sections of cushioning material; Fig. 5, a sectional face view showing a piece of protecting material of another form, and Fig. 6 a broken section on line 6 of Fig. 5.

In the illustrations, A is a spoke of the wheel, B the felly, C the rim, and D the tire. The tire D is formed of flatwise abutting sections, consisting of alternate pieces or segments of protecting material $D'$ and cushioning material $D^2$. The protecting-pieces $D'$ are formed, preferably, of a suitable metal, though hard rubber, wood, vulcanized fiber, or other sufficiently hard and durable material may be employed. The cushioning pieces or segments $D^2$ may be of any suitable comparatively soft material, though I prefer to employ soft rubber, particularly for vehicle-tires. The pieces or segments may be of any desired shape at the tread portion of the tire.

In the construction shown the rim C is a continuous channel-piece presenting an annular socket or channel $s$ with tire-engaging shoulders $s'$. The pieces $D'$, as I prefer to construct them, without, however, limiting my invention to this particular construction, have flat faces $t$, formed or provided with projections or depressions producing shoulders $t'$. If desired, the said faces may be more or less concave or convex or irregular. The segments $D^2$ may be molded or stamped out of sheet rubber when rubber is employed. They are formed at their base portions with offsets or flanges $r$, which may be on opposite sides, extending approximately one-half the thickness of the pieces $D'$, or they may, if desired, be on one side only and extend approximately the full thickness of the pieces $D'$.

The cushioning-pieces $D^2$ at their base portions fill out the socket or channel $s$ and are held in place by the shoulders $s'$. The pieces $D'$ extend at opposite edges beneath the shoulders $s'$ and rest at their inner edges against the base portions or flanges $r$ of the pieces $D^2$. To place the sections on the rim C, they are passed at their bases into the channel $s$ and subjected to longitudinal pressure to cause the shoulders $t'$ of the pieces $D'$ to embed themselves in the pieces $D^2$, as shown in Figs. 3 and 6, and cause the flanges $r$ to fill out the spaces beneath the protecting-pieces $D'$.

The sections may be under such compression as to produce a practically continuous tire, rendered, to all intents and purposes, solid by the embedment or engagement of the shoulder with the cushioning material and by the retention of the shoulders $s'$.

As a further means for holding the sections in place one or more openings $t^2$ may, if desired, be provided through the pieces D' to register with one or more openings $r'$ through the pieces $D^2$, a retaining wire or band E being passed through each series of openings and electrically welded or otherwise secured at its ends to form a continuous flexible retaining-ring. In placing the sections in position they may be crowded under great pressure to leave sufficient opening for the welding operation, and then released to expand and fill out the opening. The exposed edges of the sections are of uniform shape and produce a substantially smooth circumferential surface of the tire.

Hitherto it has been usual to form the cushion-tire for a vehicle-wheel of rubber throughout and in one continuous length. Such tires are objectionable in use for the reason mainly that their life under hard usage is very limited. They are comparatively expensive and are apt to be seriously injured in striking against sharp edges or against curbstones. It frequently happens that in running over broken glass, for example, a solid rubber tire will receive a long cut, which destroys its usefulness and makes a new tire necessary. In my construction the rubber sections or segments are comparatively thin, and the protecting-pieces are embedded or suspended in the cushioning material.

A tire thus constructed possesses all the resilience necessary and is practically as noiseless as a solid rubber tire. The protecting material operates to reduce wear and prevent serious injury to the cushioning material when the tire in use rubs against a curbstone or runs over broken glass or any sharp object. In the event that one or more of the sections become injured it is a matter of little difficulty, with the proper appliances, to replace them with new sections.

Owing to the great difference in cost between rubber and iron, for example, a tire constructed as described and employing rubber for the cushioning material and iron for the protecting material will be much less expensive, so far as cost of material is concerned, than a solid rubber tire of the same dimensions.

With appliances such as I contemplate employing, but which it is not necessary to describe in the present application, the tires may be formed very quickly and at little expense, so that a tire of my improved construction, besides being much more durable than solid rubber tires, is less expensive to manufacture.

The gist of my invention lies in forming the tire of abutting sections extending crosswise of the circumference, the sections being respectively of cushioning and protecting material, as set forth, and the protecting material or sections being cushioned in the cushioning material, and all held in place by suitable retaining means. By employing interengaging means between the sections they are held together with great tenacity.

I do not limit my invention to the use of the interengaging means between the sections nor to the use of a retaining wire or band, nor do I limit my invention to the use of a rim such as described. Though I prefer to construct the wheel as above set forth, it may be modified in the matter of details without departing from the spirit of my invention as defined by the claims, and the construction would of course be modified in adapting it to different classes of wheels or pulleys.

What I claim as new, and desire to secure by Letters Patent, is—

1. As a new article of manufacture, a cushion-tire for wheels, comprising, in combination, separate crosswise-extending segments of cushioning material, and interposed crosswise-extending sections of a harder material, held suspended by the cushioning material and forming tread portions, the cushioning and cushioned parts being held under longitudinal pressure in crosswise-abutting relation, substantially as and for the purpose set forth.

2. As a new article of manufacture, a cushion-tire for wheels, comprising, in combination, separate crosswise-extending segments of rubber, and interposed crosswise-extending sections of metal held in cushioned suspension by the rubber and forming tread portions, the cushioning and cushioned parts being held under longitudinal pressure in crosswise-abutting relation, substantially as and for the purpose set forth.

3. As a new article of manufacture, a cushion-tire for wheels, comprising, in combination, separate crosswise-extending segments of cushioning material, and interposed crosswise-extending sections of a harder material, held suspended by the cushioning material and forming tread portions, the cushioning and cushioned parts having mutually interlocking surfaces and being held under longitudinal pressure in crosswise-abutting relation, substantially as and for the purpose set forth.

4. In combination, a channeled rim provided with a central slot flanked by inward-projecting shoulders presenting sockets on opposite sides of the slot, and a cushion-tire comprising, in combination, separate crosswise-extending segments of cushioning material, approximately filling out the channel at the base thereof in the direction transversely of the circumference, and crosswise-extending sections of a harder material interposed in the tread portion of the tire and extending at opposite sides under the shoulders of the rim and cushioned by the cushioning material, the parts being held in place under the longitudinal resilience of the cushioning material, substantially as and for the purpose set forth.

5. A cushion-tire for wheels, comprising, in combination, sections $D^2$ of cushioning material provided with projecting base portions $r$, and protecting-pieces D' provided on opposite faces with engaging shoulders, the sections D' being between sections D² and resting against the base portion $r$, and all the sections being fastened in place under pressure, whereby the said shoulders interlock with the material of the cushioning-sections, substantially as and for the purpose set forth.

THOMAS J. LOVETT.

In presence of—
  M. J. FROST,
  R. T. SPENCER.